3,783,107
WATER DEPLETION UNIT FOR FUEL CELLS
Hans Kohlmuller, Erlangen, Germany, assignor to Siemens Aktiengesellschaft, Berlin and Munich, Germany
Filed May 27, 1971, Ser. No. 147,316
Claims priority, application Germany, May 29, 1970, P 20 26 219.5
Int. Cl. B01d 3/42, 13/00; H01m 27/00
U.S. Cl. 202—160                           9 Claims

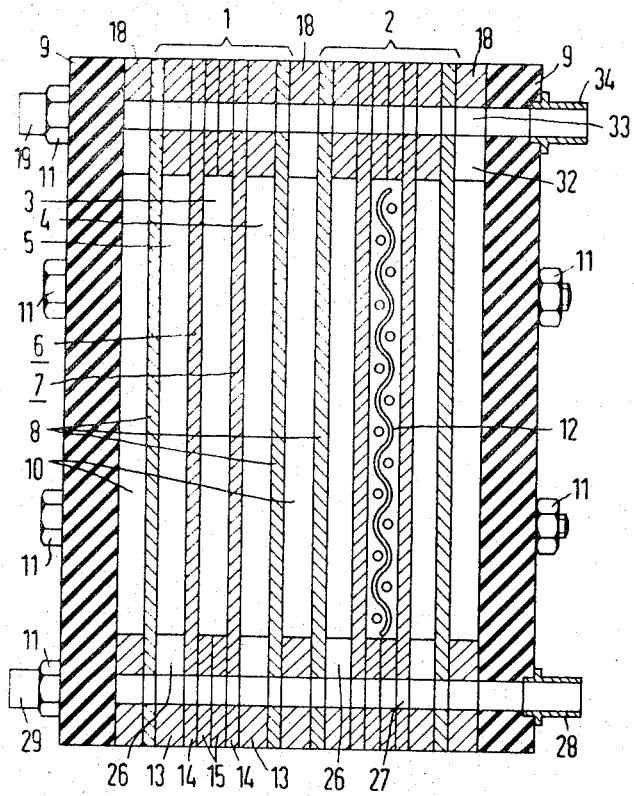
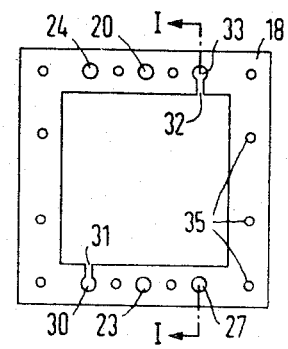
Fig. 1     Fig. 3
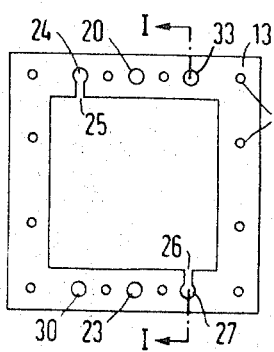 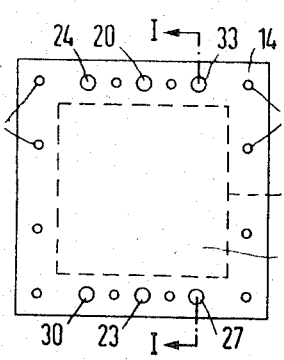 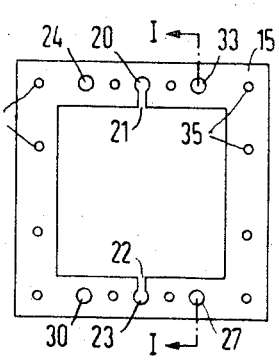
Fig. 2a     Fig. 2b     Fig. 2c United States Patent Office 3,783,107
Patented Jan. 1, 1974

ABSTRACT OF THE DISCLOSURE

A filter-press type water depletion unit for removing reaction water from the electrolyte cycle of a fuel cell battery forms a depletion cell having at least one gas space and an electrolyte space. The depletion unit has a coolable structure bordering the gas space and a diaphragm member separates the gas space from the electrolyte space, the diaphragm member having a rim portion that is gas-tight and impervious to electrolyte. The rim portion has a thickness greater than the remaining portion of the diaphragm. A holding arrangement presses the rim portion at its lateral surfaces for sealing the gas space and the electrolyte space and the rim portion is provided with respective passages communicating with the gas space and the electrolyte space.

My invention concerns a water depletion unit of the filter-press type construction for removing the reaction water from the electrolyte cycle of a fuel cell battery with water depletion cells including an electrolyte space. There is at least one gas space separated from the electrolyte space by an asbestos diaphragm, and a surface which can be cooled, adjoining the gas space.

If fuel cell batteries are operated with hydrogen or hydrogen-containing compounds as reactants, reaction water is generated which dilutes the electrolyte of the fuel cell battery and must therefore be removed from the electrolyte.

From the Austrian Pat. 277,341 a water depletion cell is known, which consists of an electrolyte space inserted into the electrolyte cycle of the fuel cell battery, at least one gas space and a surface that can be cooled, adjoining the gas space. In this known water depletion cell the electrolyte space is separated from the gas space by a diaphragm which can consist of porous asbestos paper. In this cell the water depletion takes place in that the water evaporates from the electrolyte flowing through the electrolyte space, through the asbestos diaphragm into the gas space and is condensed and separated out at the cooled surface adjoining the gas space. The water is collected in the gas space and is removed from the latter through a suitable lock. The hydrostatic pressure of the electrolyte is here cancelled by the gas pressure in the gas space or by the capillary depression in the asbestos diaphragm, so that no electrolyte can enter the gas space. In another design of this known water depletion cell the surface which can be cooled and in this case is cooled by a steam of liquid, also consists of a porous diaphragm. In this design, the water which is evaporated from the electrolyte and diffused through the gas space is condensed at the porous cooling surface and is immediately pushed through the pores of this surface into the cooling liquid. The water is here removed with the cooling liquid, so that no special devices are required for the discharge of the water.

It has been proposed for a water depletion cell with an electrolyte space wherein a gas space is separated from the electrolyte space by a diaphragm and a surface that can be cooled to divide the gas space into two subspaces separated by a further porous surface. The subspace of the gas space which is situated between the further porous surface and the non-porous surface which can be cooled then forms a condensate space. The water vapor diffused from the electrolyte through the diaphragm into the gas space is condensed in this water depletion cell at the second porous surface; because of the gas pressure in the gas space, the water formed is pushed through the second porous surface into the condensate space and is removed from there.

In order to combine such water depletion cells into water depletion units for fuel cell batteries, use can be made of the so-called filter press technique, where several water depletion cells are arranged in a stack and are clamped together between end plates by means of bolts. The ducts for electrolyte, gas and coolant traverse the entire stack. To this end, the individual parts of the water depletion cells, in particular, the asbestos diaphragms were heretofore built into plastic frames into which the respective feed lines to the gas and electrolyte spaces were fabricated. These plastic frames were sealed against each other and against plate-shaped structural parts by means of inserted sealing rings of rubber or plastic.

The type of filter press construction practiced up to now is, however, accompanied by various shortcomings, which are noticeable particularly in water depletion units for fuel cell batteries of large capacity, say, several kilowatts. For the effective removal of water from the electrolyte cycle of such fuel cell batteries, there is required an evaporation surface for the water that is as large as possible. In the construction of water depletion units a multiplicity of water depletion cells must therefore as a rule be combined to form a water depletion unit. The use of plastic frames, for instance, plexiglass frames, for such water depletion units is expensive and time-consuming because of the labor required for the manufacture of the plastic frames and the installation of the asbestos diaphragms. The multiplicity of the required sealing elements, for instance, sealing rings, which must be inserted between the plastic frames with considerable effort can impair the reliability of operation particularly in water depletion units which consist of many water depletion cells. Especially in water depletion units consisting of very many water depletion cells it is furthermore desirable that the individual water depletion cells be as thin as possible in order to reduce the volume of the battery. However, there are limits to this because of the plastic frames since the latter cannot be made thinner than a certain minimum thickness due to the required strength.

Accordingly, it is an object of my invention to provide a water depletion unit of the filter-press type which overcomes the disadvantages related to the plastic frames used with the water depletion units of the prior art.

It is another object of my invention to provide a water depletion unit of the filter-press type which minimizes or obviates the use of sealing rings. It is still another object of my invention to provide a depletion unit which is thin relative to known depletion unit configurations.

According to a feature of the invention an asbestos diaphragm with an electrolyte-impervious, gas-tight rim of increased thickness is provided and seals the electrolyte space and the gas space by being pressed at the lateral surfaces of the rim portion. Feed channels to the electrolyte and gas spaces are fabricated into the reinforced rim.

Because of the pressure exerted by the bolts in the filter press-type construction, the rims of the asbestos diaphragms, increased in thickness, seal the gas and electrolyte spaces of the water depletion cells extremely well against the outside, so that additional sealing elements such as gasket rings are no longer necessary.

The plastic frames required up to now are completely eliminated, because the thickness-reinforced, electrolyte-impervious and gas-tight rims of the asbestos diaphragms take the place of the frames. Thereby all limitations caused up to now by the plastic frames with regard to a design as thin as possible of the individual water depletion cells of water depletion unit are eliminated at the same time. Furthermore, the design of the water depletion unit is substantially simplified.

It is advantageous to configure the water depletion cells so that each has two gas spaces between which the electrolyte space is situated. The electrolyte space can be separated from the two gas spaces by respective asbestos diaphragms each having a thickness-reinforced, electrolyte- impervious, gas-tight rim. Through this construction, in which the electrolyte space is bounded on both sides by asbestos diaphragms, a large evaporation surface is obtained within each water depletion cell.

If the cooling surface structure which adjoins the gas space is a porous surface in the manner known per se, it can be advantageous to have this structure as an asbestos diaphragm with a thickness-reinforced, electrolyte-impervious, gas-tight rim, the latter being fabricated with channels for the coolant to cool the surface provided for this purpose.

In water depletion cells in which, as already proposed, the gas space is partitioned by a porous surface into two subspaces so that a special condensate space is created, this porous surface can also be an asbestos diaphragm with a thickness-reinforced, electrolyte-impervious, gas-tight rim.

The asbestos diaphragms with reinforced rim can themselves be manufactured in one piece by using suitable molds for manufacturing the asbestos paper for the diaphragms and can be made impervious to the electrolyte and gas-tight at the rims by impregnation with suitable electrolyte-resist ant plastic materials.

It is, however, particularly advantageous to build up the thickness-reinforced rims of the asbestos diaphragms from three layers, wherein the middle layer which forms the continuation of the central portion of the asbestos diaphragm is saturated with a multi-component synthetic resin and is cemented to the two outer layers, and wherein the two outer layers which contain the fabricated-in feed channels are filled with a softer, electrolyte-resistant plastic material.

In this construction, the individual parts of the asbestos diaphragms can be fabricated first separately, whereby in particular, the fabrication of the feed channels is simplified. Because of the multi-component synthetic resin, the rim of the middle layer becomes impervious to the electrolyte and gas-tight. At the same time the multi-component synthetic resin serves to cement the middle layer to the two outer layers. By curing the multi-component synthetic resin after cementing, an excellent, tight cement bond with the two outer layers is obtained. At the same time the middle layer is strengthened so that upon compression of the individual parts of the water depletion unit it cannot be forced into the feed channels which are provided in the two outler layers. As the outer layers are filled with a softer synthetic material they can be deformed to some extent upon compression, so that the sealing effect is further improved.

Electrolyte-resistant epoxy resins are particularly well suited as multi-component synthetic resins. As the softer, electrolyte-resistant synthetic materials for the outer layers, especially polytetrafluoroethylene or polyvinylchloride should be considered.

The invention will now be described with reference to the drawing which illustrates a water depletion unit according to the invention wherein:

FIG. 1 shows schematically, in cross-section, an embodiment of the water depletion unit of the invention;

FIGS. 2a to 2c show the indvidual layers of the asbestos diaphragms for the water depletion unit according to FIG. 1;

FIG. 3 shows a further detail of the water depletion unit according to FIG. 1;

Figure 4:
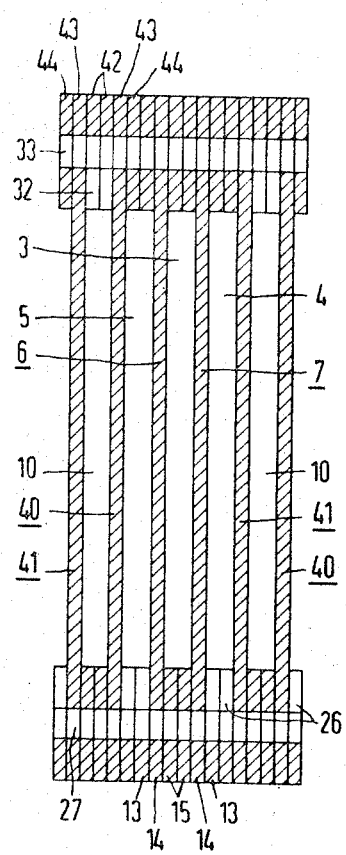
FIGS. 4 and 5 show schematically, in cross-section, respective alternate embodiments of the water depletion unit according to the invention.

The water depletion unit shown in FIG. 1 consists of two water depletion cells 1 and 2. Each water depletion cell contains an electrolyte space 3 which is situated between two gas spaces 4 and 5. The electrolyte space 3 is separated from the gas space 5 by an asbestos diaphragm 6, and from the gas space 4 by an asbestos diaphragm 7. Adjoining each of the gas spaces 4 and 5 are heat conductive surface members 8, for instance, of sheet nickel, which can be cooled. Between the two opposite cooling surfaces 8 of the water depletion cells 1 and 2 and between the cooling end surfaces 8 of water depletion unit and the end plates 9, cooling spaces 10 are provided. Through these cooling spaces can flow a liquid or gaseous coolant, for instance water, which serves to cool the cooling surfaces 8. The water depletion cells are arranged in a stack and are clamped between the two end plates 9 by means of bolts 11. The end plates 9 can consist, for instance, of plexiglass or glass fiber-reinforced epoxy resin or of metal. The individual spaces of the water depletion cells can be laid in with metal or plastic screen which serves as a spacer especially between the asbestos diaphragms. Such a screen 12 is shown in the electrolyte space of the water depletion cell 2.

The asbestos diaphragms 6 and 7 which separate the electrolyte space 3 from the gas spaces 4 and 5 each have a thickness-reinforced rim which consists of three layers 13, 14 and 15. In the asbestos diaphragm 7 the order of these layers is the reverse of that of the asbestos diaphragm 6. The layers are shown on a reduced scale and in top view in FIGS. 2a to 2c. FIG. 1 shows these layers in cross-section along the line I—I. The middle layer 14 of the reinforced rim forms the continuation of the central portion 16 of the respective asbestos diaphragms. In FIG. 2b this central portion is delineated from the rim zone by the dashed line 17. The outer layers 13 of the rim zones of the asbestos diaphragms in each case enclose one of the gas spaces 4 and 5. The outer layers 15 of the two adjoining asbestos diaphragms 6 and 7 enclose jointly the electrolyte space 3.

To seal the cooling spaces 10, frame-like sealing elements 18, for instance, of asbestos filled with plastic material, are provided. Such a sealing element is shown in top view on a reduced scale in FIG. 3.

The rims 13, 14 and 15 of the asbestos diaphragms 6 and 7, the sealing element 18, and as far as required, the end plates 9 are provided with holes which in the assembled water depletion unit form ducts traversing the stack for feeding and discharging the electrolyte, the gas, the cooling water and the water removed from the electrolyte.

The water-containing electrolyte, for instance potassium hydroxide, is fed via the nipple 19, visible in FIG. 1 behind the head of the bolt 11, to the duct which is formed by the holes 20. It passes through the channels 21 which are in each case provided in the layers 15 of the rims of the asbestos diaphragms, to the electrolyte spaces 3 of the individual water depletion cells, flows through them in parallel and then enters after removal of the water, through the further channels 22 provided in the layers 15 of the rims of the asbestos diaphragms into the duct formed by the holes 23 and is discharged through it from the water depletion unit. The water diffuses in the electrolyte spaces 3 from the hot electrolyte through the asbestos diaphragms 6 and 7 into the gas spaces 4 and 5 and is condensed at the cooled surfaces 8. In order to compensate for the electrolyte pressure in the electrolyte space 3 and to prevent the electrolyte from penetrating into the gas spaces 4 and 5, these gas spaces are kept under a slight over-pressure of, for instance, 0.4 atm. For this purpose, a gas, for instance, oxygen or hydrogen, is fed to the gas spaces via the duct formed by the holes 24 and the channels 25 provided in the layers 13 of the rims of the asbestos diaphragms. The water condensed in the gas spaces enters into the collecting duct formed by the holes 27 via the channels 26 in the layers 13 of the rims of the asbestos diaphragms and is removed from the water depletion unit via the nipple 28 and a suitable lock.

The coolant, for instance water, is fed to the water depletion unit via a nipple 29, visible behind the head of the bolt 11, and enters via the duct formed by the holes 30 and the channel 31 provided in the sealing element 18 into cooling spaces 10, flows through them in parallel and is discharged via the channels 32 provided in the sealing elements 18 and the duct formed by the holes 33 from the water depletion unit via the nipple 34. The holes 35 are for the bolts 11.

The center part of the asbestos diaphragms 6 and 7 shown in FIG. 2b can consist of asbestos paper free of binder, which is manufactured from asbestos fibers pretreated with potassium hydroxide, for instance, by the method given in French Pat. 1,556,744 and can be annealed in order to harden it at a temperature of about 450°. The center part of the asbestos diaphragm shown in FIG. 2b can, however, also contain a plastic binder provided it does not lose its hydrophilic properties thereby and remains sufficiently porous to make possible good diffusion of the water evaporating from the electrolyte. A butadiene styrol acrylonitrile copolymerisate is particularly suitable as a binder. The nitrile groups are advantageously saponified here with potassium hydroxide in the finished diaphragm to form hydratizable carboxyl groups in order to give hydrophilic properties to the diaphragm. The percentage of this binder can be 6 to 15% by weight, referred to the weight of the asbestos. Other binders, such as for instance, chloroprene in quantities of 0.5 to 6% by weight, referred to the weight of the asbestos, are also suited. Methods for the manufacture of these binder-containing asbestos diaphragms and other suitable binder materials are described in French Pat. 1,546,172.

The parts of the asbestos diaphragm shown in FIGS. 2a and 2c consist of asbestos material which is filled with a relatively soft, electrolyte-resistant synthetic material. Especially polytetrafluoroethylene and polyvinylchloride are suitable. The synthetic material percentage can, for instance, be about 10% by weight, referred to the weight of the asbestos. The same material may be used for the sealing element 18 shown in FIG. 3. For fabrication, asbestos fibers can, for instance, be mixed with plastic powders or emulsions and subsequently be formed by hot pressing or filtering off and drying.

For the fabrication of the asbestos diaphragms with thickness-reinforced rims one can advantageously proceed as follows: First, the channels 21, 22, 25 and 26 are worked into the outer layers 13, for instance, by stamping. At the same time the necessary holes can also be punched in the parts shown in FIGS. 2a to 2c. The punching of the holes can, however, also be done in the completed asbestos diaphragm. The rim zone of the middle layer 14 delineated by the dashed line 17 is then saturated with an electrolyte-resistant multi-component synthetic resin, for instance, a commercially available epoxy resin. Care must be taken here that no uncovered paths crossing through the rim zone remain which could impair the tightness of the rim zone against the electrolyte and gas. The impregnating of the rim zone can be accomplished by immersion into the epoxy resin by painting with the epoxy resin, or also by applying the epoxy resin in another manner, for instance by means of a screen-printing method. After saturating the rim zone of the middle layer 14 with epoxy resin, the layers 13, 14 and 15 are placed on top of each other. Then the epoxy resin is cured at elevated temperature. After curing, the layers 13, 14 and 15 are cemented together by the epoxy resin so as to be electrolyte- and gas-tight.

The completed asbestos diaphragms 6 and 7 with thickness-reinforced rims are then stacked with the cooling surfaces 8 and the sealing elements 9 to form a stack. If desired the screens 12 are inserted into the electrolyte, gas and cooling spaces at the same time. The completed stack is clamped between the end plates 9 by means of the bolts 11. In the process, the reinforced rims of the asbestos diaphragms 6 and 7 are firmly pressed against each other and the cooling surfaces 8, respectively, and completely seal the electrolyte and gas spaces of the water depletion unit against the outside so as to be electrolyte-tight and gas-tight.

As already mentioned, the individual water depletion cells can be made very thin by this type of construction. The spacing of the diaphragms 6 and 7 from each other and from the cooling surfaces 8 can, for instance, be 0.3 to 0.5 mm. The middle layers 14 of the asbestos diaphragms and the cooling surfaces 8 can, for instance, be 0.15 to 0.3 mm. thick. The central portion of the asbestos diaphragms can have a volme porosity of, for instance, between 20 and 80%.

As already mentioned, the cooling surfaces in the water depletion unit according to the invention may also consist of asbestos diaphragms with reinforced rims. A part of such a water depletion unit, which consists of an electrolyte space 3, two gas spaces 4 and 5 and two cooling spaces 10, is shown in FIG. 4. The parts corresponding to like parts of the embodiment of FIG. 1 are designated with the same reference numbers. The cooled surfaces provided on both sides of the cooling spaces 10 are asbestos diaphragms 40 and 41 with reinforced rims which consist of the respective layers 42, 43 and 44. The order of these layers in the asbestos diaphragm 41 is the reverse of that in the asbestos diaphragm 40. The reinforced rims 42 of the asbestos diaphragms 40 and 41, which together enclose the cooling spaces 10, correspond as to shape to the sealing element shown in FIG. 3. The layers 44 of the reinforced rims of the asbestos diaphragms 40 and 41, which together with the adjoining layers 13 of the rims of the asbestos diaphragms 6 and 7 enclose the gas spaces 4 and 5, correspond as to shape to the layers 13 shown in FIG. 2a. The central layers 43 of the asbestos diaphragms 40 and 41 correspond as to shape to the middle layer shown in FIG. 2b. The electrolyte, cooling water and gas are fed in the same manner as in the water depletion unit according to FIG. 1, except that the water condensed at the cooled surfaces 40 and 41 is not discharged from the water depletion unit via the channels 26 and the duct formed by the holes 27. Instead, this water diffuses through the diaphragms 40 and 41 into the cooling spaces 10 and is removed along with the coolant via the channels 32 and the duct formed by the holes 33. In order to prevent the water from leaving via the channels 26 and the duct formed by the holes 27, this line can be equipped with a suitable valve which permits only a weak flow of the pressurized gas through the gas spaces 4 and 5. If desired, the channels 26 and the holes 27 can be omitted altogether.

The asbestos diaphragms 40 and 41 are manufactured by cementing the corresponding parts together in the same manner as the asbestos diaphragms of the water depletion unit according to FIG. 1. With the exception of the end plates, the water depletion unit shown in FIG. 4 is constructed completely from asbestos diaphragms with reinforced rims.

Figure 5:
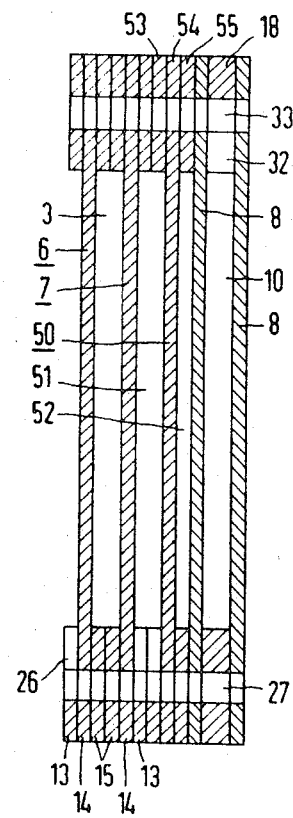

Another embodiment of the invention is shown in FIG. 5. In this part, which has an electrolyte space 3 defined by the asbestos diaphragms 6 and 7 and a cooling chamber 10 defined by non-porous cooling surfaces 8, for instance, of sheet metal the gase space is divided into two subspaces by an asbestos diaphragm 50 with reinforced rims.

In FIG. 5, the same reference numbers as in FIG. 1 are used for the parts corresponding to those in FIG. 1.

The subspace 52 serves as the condensation space. The water condensed at the asbestos diaphragm 50 is pushed therethrough into the condensate space 52 and from there is discharged from the water depletion unit. The reinforced rim of the asbestos diaphragm 50 consists of three layers 53, 54 and 55. The layer 53 encloses, together with the layer 13 of the asbestos diaphragm 7, the gas space 51. The layer 55 encloses the condensate space 52 and is pressed against the cooled surface 8. For the removal of the water from the condensate space 52, a water discharge channel is provided in the layer 55 of the rim of the asbestos diaphragm 50, which is not visible in the cross-section shown in FIG. 5. This water discharge channel opens into a duct formed by an additional row of holes in the rims of the asbestos diaphragms and in the cooled surfaces. Except for this duct, the individual layers of the rims of the asbestos diaphragms correspond again to the layers shown in FIGS. 2a to 2c. So that the condensed water cannot leave the water depletion unit from the gas space 51 via the channels 26 and the duct formed by the holes 27, it is desirable to take the steps explained in connection with the embodiment of FIG. 4. A screen can further be inserted in the condensate space 52 as a spacer. Through such a screen which makes contact with the diaphragm 50 as well as with the cooled surface 8, the cooling of the diaphragm 50, serving as the condensation surface, is at the same time improved because of the heat conduction through the screen.

The water depletion unit according to the invention can be modified in many ways over the embodiments shown in the drawings. Instead of a square shape, for instance, another rectangular, polygonal or round shape can be selected. Instead of two gas spaces, only one gas space can be associated with each electrolyte space on one side only. The water depletion unit is suited for fuel cell batteries which are operated with gaseous, hydrogen-containing fuels as well as for fuel cell batteries which are operated with liquid hydrogen-containing fuels, which can be admixed to the electrolyte if required. Thus, my invention permits of various modifications and may be given still further embodiments other than particularly illustrated herein, without departing from the essential features of the invention and within the scope of the claims annexed hereto.

I claim:

1. Filter-press type water depletion unit for removing reaction water from the electrolyte cycle of a fuel cell battery, said depletion unit forming at least one depletion cell having at least one gas space and an electrolyte space, said depletion cell comprising a coolable structure bordering the gas space, a diaphragm member separating the gas space from the electrolyte space, said diaphragm member having a rim portion of increased thickness, said diaphragm member including said rim portion of increased thickness being made of an asbestos rim portion of increased thickness being further impregnated with an electrolyte-resistant plastic material, said rim portion having respective passages communicating with the gas space and the electrolyte space, and holding means for pressing said rim portion at its lateral surfaces whereby said pressing together of said rim portions provides a sealed rim.

2. A water depletion unit according to claim 1, forming at least one depletion cell having two gas spaces, said electrolyte space being disposed between said gas spaces, said depletion cell comprising two of said diaphragm members disposed at the respective interfaces of the gas spaces and the electrolyte space for separating the latter from the gas spaces.

3. In a water depletion unit according to claim 1, said coolable structure comprising another asbestos diaphragm having a rim portion of a thickness greater than the remaining portion of said diaphragm, said last-mentioned rim portion being impregnated with an electrolyte-resistant plastic material, said last-mentioned rim portion having channels for directing a cooling medium.

4. In a water depletion unit according to claim 1, said gas space of said depletion cell being partitioned by another asbestos diaphragm having a rim portion of a thickness greater than the remaining portion of said diaphragm, the last-mentioned rim portion being impregnated with an electrolyte-resistant plastic material.

5. A depletion unit according to claim 1, said rim portion of said asbestos diaphragm consisting of three contiguous layers, the intermediate layer extending over the entire region enclosed by said rim and constituting the asbestos diaphragm proper, the rim portion of said intermediate layer being impregnated with an electrolytic resistant, multicomponent synthetic resin and cemented to the two outer layers, said two outer layers being filled with and electrolytic resistant synthetic material softer than said resin, said passages being contained in said outer layers.

6. In a water depletion unit according to claim 5, said multicomponent synthetic resin being an electrolyte resistant epoxy resin.

7. In a water depletion unit according to claim 5, said synthetic material being polytetrafluoroethylene.

8. In a water depletion unit according to claim 5, said synthetic material being polyvinylchloride.

9. In a water depletion unit according to claim 1, wherein said diaphragm and rim portion are made from one piece of asbestos material, said asbestos rim portion of increased thickness being subsequently impregnated with said electrolyte-resistant material.

References Cited
UNITED STATES PATENTS

| | | | |
|---|---|---|---|
| 3,533,852 | 10/1970 | Baker et al. | 136—86 R |
| 3,649,467 | 3/1972 | Winsel et al. | 210—321 X |
| 3,497,423 | 2/1970 | Rodgers | 203—10 |
| 3,608,610 | 9/1971 | Greatbzex | 159—Dig 27 |

FRANK A. SPEAR, JR., Primary Examiner

T. A. GRANGER, Assistant Examiner

U.S. Cl. X.R.

202—172, 173; 55—128; 136—86 R; 159—Dig 28; 210—180